United States Patent
Beaujot

(10) Patent No.: US 9,655,296 B2
(45) Date of Patent: May 23, 2017

(54) BIASED DIAGONAL IMPLEMENT BRACE

(75) Inventor: Norbert Beaujot, Regina (CA)

(73) Assignee: SEEDMASTER MANUFACTURING LTD., Emerald Park, SK (CA)

(*) Notice: Subject to any disclaimer, the term of this patent is extended or adjusted under 35 U.S.C. 154(b) by 1829 days.

(21) Appl. No.: 12/224,039

(22) PCT Filed: Feb. 6, 2007

(86) PCT No.: PCT/CA2007/000169
§ 371 (c)(1),
(2), (4) Date: Nov. 5, 2010

(87) PCT Pub. No.: WO2007/093034
PCT Pub. Date: Aug. 23, 2007

(65) Prior Publication Data
US 2011/0048749 A1  Mar. 3, 2011

(30) Foreign Application Priority Data

Feb. 15, 2006  (CA) ..................... 2536551

(51) Int. Cl.
*A01B 61/00* (2006.01)
*A01B 51/04* (2006.01)
(52) U.S. Cl.
CPC .............. *A01B 51/04* (2013.01); *A01B 61/00* (2013.01)
(58) Field of Classification Search
CPC .................................................. A01B 61/00
USPC ...................... 172/260.5, 311, 776
See application file for complete search history.

(56) References Cited

U.S. PATENT DOCUMENTS

| 3,172,481 A * | 3/1965 | Trollsas ..................... 172/260.5 |
| 3,416,611 A * | 12/1968 | Fischer ..................... 172/260.5 |
| 3,429,381 A * | 2/1969 | Launder et al. .............. 172/815 |
| 3,543,862 A * | 12/1970 | Wenzel et al. ............. 172/260.5 |
| 3,791,673 A | 2/1974 | Hornung |
| 3,897,832 A * | 8/1975 | Leedahl et al. ............... 172/311 |
| 3,905,425 A * | 9/1975 | Jackson ........................ 172/321 |

(Continued)

FOREIGN PATENT DOCUMENTS

| CA | 1187731 | 5/1985 |
| CA | 1231578 | 1/1988 |

(Continued)

OTHER PUBLICATIONS

International Search Report for PCT/CA2007/000169, mailed May 28, 2007.

(Continued)

*Primary Examiner* — Thomas B Will
*Assistant Examiner* — Joel F. Mitchell
(74) *Attorney, Agent, or Firm* — Nixon & Vanderhye, P.C.

(57) ABSTRACT

A diagonal brace apparatus for an implement frame includes a bias element connected to a front location on a front portion of the implement frame and connected to a rear location on a rear portion of the implement frame laterally offset from the front location. The bias element is operative to exert a bias force resisting rearward movement of an outer end of the implement frame with respect to an inner end of the implement frame. Conveniently the bias element is provided by a hydraulic cylinder which exerts a bias force and can extend to allow the frame to flex to reduce shock loading on the implement when excessive forces are exerted on the frame.

7 Claims, 2 Drawing Sheets

(56) References Cited

U.S. PATENT DOCUMENTS

| | | | |
|---|---|---|---|
| 4,034,623 A * | 7/1977 | Boone et al. | 74/522 |
| 4,113,273 A * | 9/1978 | Gates | 280/413 |
| 4,319,643 A | 3/1982 | Carter et al. | |
| 4,479,312 A * | 10/1984 | Turgeon | 37/219 |
| 4,504,076 A | 3/1985 | Bedney | |
| 4,596,290 A | 6/1986 | Bedney | |
| 4,660,652 A * | 4/1987 | Moos et al. | 172/260.5 |
| 4,683,957 A | 8/1987 | Bussiere | |
| 4,721,167 A | 1/1988 | Salley et al. | |
| 4,825,958 A * | 5/1989 | Kelderman | 172/413 |
| 4,881,603 A * | 11/1989 | Hartman | 172/311 |
| 5,062,489 A * | 11/1991 | Adee | 172/311 |
| 5,177,887 A * | 1/1993 | McGugan et al. | 37/236 |
| 5,234,060 A * | 8/1993 | Carter | 172/413 |
| 6,408,950 B1 | 6/2002 | Shoup | |
| 6,684,962 B1 | 2/2004 | Lewallen | |
| 6,708,775 B2 * | 3/2004 | Beaujot | 172/126 |
| 7,063,167 B1 * | 6/2006 | Staszak et al. | 172/328 |
| 7,861,795 B2 * | 1/2011 | Dillon | 172/452 |

FOREIGN PATENT DOCUMENTS

| | | |
|---|---|---|
| CA | 1280644 | 2/1991 |
| CA | 1281229 | 3/1991 |

OTHER PUBLICATIONS

Written Opinion of the International Searching Authority for PCT/CA2007/000169, mailed May 28, 2007.

\* cited by examiner

BIASED DIAGONAL IMPLEMENT BRACE

This application is the U.S. national phase of International Application No. PCT/CA2007/000169, filed 6 Feb. 2007, which designated the U.S. and claims priority to Canada Application No. 2,536,551, filed 15 Feb. 2006, the entire contents of each of which are hereby incorporated by reference.

This invention is in the field of implements such as are used in agriculture where the implement extends laterally from a towing vehicle, and in particular the frames of such implements.

BACKGROUND

Agricultural implements such as cultivators, seeders, and the like commonly comprise a frame configured to extend laterally from a central hitch where a tractor is connected for towing the implement. The frame typically comprises a lateral beam extending generally perpendicular to the path of the implement, and a fore and aft beam extending generally in alignment with the implement path, as for example in the implement generally illustrated in U.S. Pat. No. 5,113,956 to Friesen et al. In the implement of Friesen et at. the implement frame comprises a single lateral beam extending to each of the right and left sides of the implement, and a single fore and aft beam to which the inner ends of the right and left lateral beams are attached. The hitch for attachment of the tractor to tow the implement is on the front end of the fore and aft beam.

It is desired in many implements to have several rows of ground engaging tools extending laterally from the implement path along the frame in order that a rear tool follows a path that is offset from the path of a leading tool. A plurality of lateral beams is spaced from the front of the implement to the rear thereof, and the lateral beams are connected by fore and aft beams extending generally in alignment with the implement path, as illustrated for example in U.S. Pat. No. 6,684,962 to Lewallen and U.S. Pat. No. 4,683,957 to Bussiere.

The lateral and fore and aft beams are welded or bolted together to form a rigid structure that will have sufficient structural strength to resist deforming when the ground engaging tools are engaged in the ground. The hitch is typically attached to the middle of the frame where inner ends of the lateral beams are attached to fore and aft beams. The lateral beams extend laterally outward, to outer ends located on each side. The width of such implements varies considerably, and modern implement are commonly 60 feet wide or more.

As the frame moves forward towed by the tractor, the hitch exerts the required force on inner ends of the lateral beams to move the tools through the ground. The tools resist the movement and thus exert a rearward force on the lateral beams of the frame. The tools on the outer ends of the frame exert a considerable bending force on the lateral beams relative to the inner ends of the frame, where the force to move the frame forward is exerted. Up to a point the beams can be made strong enough to resist this bending force, and outer ends of the lateral beams will flex rearward in response to shock forces such as when the implement strikes a rock, root, or like obstruction. The lateral beams thus act like a shock absorber to limit the peak forces on the frame, wing hinges, hitch, and the like.

While such flexing is beneficial, excessive flexing leads to accelerated metal fatigue and eventually to frame failure. Particularly in wider implements where the forces exerted on the outer end of the frame during operation can be large it is required to provide diagonal braces. The brace can be a cable or beam extending generally from a front inner portion of a frame section to an outside rear portion of the frame section, such that a rearward force on the outer end of the frame section puts the brace in tension. Similarly the brace can be a rigid beam extending generally from a rear inner portion of a frame section to an outside front portion of the frame section, such that a rearward force on the outer end of the frame section puts the beam in compression. The flexing rearward movement of the outside end of the frame section is thus resisted by the brace tied to the inner portion, nearer the inner ends of the lateral beams where the force is exerted by the towing tractor Such diagonal braces render the frame section diagonally rigid. Metal fatigue is reduced, but the frame section can no longer flex to absorb shock loads, and peak forces on the frame, wing hinges, and hitch increase, and peak forces on the diagonal brace can be very high. Thus considerable reinforcement of the frame members is required to resist the higher shock forces on the frame.

A typical implement frame structure with braces in both tension and compression is generally illustrated in U.S. Pat. No. 6,684,962 to Lewallen.

SUMMARY OF THE INVENTION

It is an object of the present invention to provide a diagonal brace apparatus for implements that overcomes problems in the prior art.

The invention provides, in one embodiment, a diagonal brace apparatus for an implement frame. The apparatus comprises a bias element adapted at a first end thereof for connection to a front location on a front portion of the implement frame and adapted at a second end thereof for connection to a rear location on a rear portion of the implement frame laterally offset from the front location. The bias element is operative to exert a bias force resisting rearward movement of an outer end of the implement frame with respect to an inner end of the implement frame when connected to the implement frame.

In a second embodiment the invention provides an implement frame comprising at least one lateral beam having an inner beam end attached to an inner portion of the implement frame, the at least one lateral beam extending from the inner beam end outward to an outer beam end. A hydraulic cylinder has a first end connected to a front inner portion of the implement frame forward of the inner beam end, and a second end connected to an outer portion of the lateral beam. A hydraulic source is operative to supply hydraulic fluid to the hydraulic cylinder at a bias pressure such that the hydraulic cylinder exerts a bias force urging the outer portion of the lateral beam toward the front inner portion of the implement frame. The hydraulic source is operative to allow hydraulic fluid to flow out of the hydraulic cylinder when a force is exerted on the hydraulic cylinder that is greater than the bias force.

In a third embodiment the invention provides an implement apparatus comprising a wing frame pivotally attached at an inner end thereof to an outer end of a middle frame. The wing frame comprises inner and outer fore and aft beams and front and rear lateral beams, each lateral beam having an inner beam portion attached to the inner fore and aft beam and an outer beam portion attached to the outer fore and aft beam. A diagonal wing brace comprises a hydraulic cylinder having a first end connected to a front inner portion of the wing frame, and a second end connected to an outer rear portion of the wing frame. An active hydraulic source is operative to supply hydraulic fluid to the hydraulic cylinder at a substantially constant bias pressure such that the hydraulic cylinder exerts a substantially constant bias force urging the outer rear portion of the wing frame toward the front inner portion of the wing frame, and the active hydraulic source is operative to allow hydraulic fluid to flow out of the hydraulic cylinder when a force is exerted on the hydraulic cylinder that is greater than the bias force.

The diagonal brace of the invention exerts a forward preload force on the outer end of the frame, causing the outer end of the frame to flex somewhat forward. When normal working forces are applied to the outer end of the frame, such as when the implement is engaged in the ground, the outer end of the frame flexes rearward against the bias force of the brace from the preloaded position to a median working position. When a shock force is exerted on the outer end of the frame, such as when striking an obstruction or hard compacted soil, the outer end of the frame flexes farther rearward against the bias force. Similarly when the outer end of the frame encounters somewhat softer soil it will flex forward somewhat from the median working position.

Conventionally, the lateral beams experience only a rearward force exerted thereon by the ground engaging tools or like forces, such that they move from an unloaded position, typically about perpendicular to the operating travel direction, rearward to a normal working position, and when excessive forces are experienced they move farther rearward. Thus the range of flexing motion is from a forward position that is perpendicular to a rearward position. The lateral beams only flex rearward from the perpendicular position.

In contrast, in an implement with the diagonal brace of the present invention the range of flexing motion is from a forward position that is forward of the perpendicular position to a rearward position that is rearward of the perpendicular position. The lateral beams thus flex both forward and rearward from the perpendicular position.

Steel beams can flex both forward and rearward from a neutral position up to a yield point at which the beam will bend. As the beam gets closer to the yield point while flexing during operation, metal fatigue increases. Where a lateral beam flexes only rearward during operation, all forces tend to move the beam toward the rearward yield point. The diagonal brace of the invention initially loads and flexes the lateral implement beams somewhat forward, such that forces exerted on the outer ends of the beams first move the beams rearward toward the neutral position, and only when the forces increase do they flex past the neutral position toward the rearward yield point. The beams thus flex in a range on both sides of the neutral position, closer to the middle of the range between forward and rearward yield points, reducing metal fatigue.

The amount of flex can be selected by increasing or decreasing the bias force. Where the bias element is a hydraulic cylinder connected to an active hydraulic source, at the design stage, the bias force can be changed by changing the diameter of the hydraulic cylinder, or even after installation it is a relatively simple and inexpensive operation to change the hydraulic cylinder. During field operations the bias force can be adjusted by adjusting the bias pressure in the hydraulic cylinder. Such pressure adjustment means is commonly available in such active hydraulic sources as are used in agricultural, since it is sometimes desirable to vary the bias force on furrow openers, or the down pressure on implement wings. For example where the soil being worked is relatively soft, the down pressure on furrow openers is often decreased, and correspondingly with the brace of the invention, in relatively soft soil conditions the rearward forces on the outer ends of the frame are reduced as well, compared to hard soil conditions and a reduced bias force is satisfactory. Conversely where soil is hard, more bias force is required on the furrow openers and on the diagonal brace, and the bias pressure is increased.

Where the active hydraulic source is shared by the hydraulic cylinder on the diagonal brace with hydraulic cylinders on furrow openers or like, hydraulic pressure is released to raise the furrow openers for transport, or when turning at headlands. There will then be no pressure in the brace cylinder either, however no working forces are being exerted that are required to be resisted by the brace.

The hydraulic source for the hydraulic cylinder can also include an accumulator operative to supply hydraulic fluid to the hydraulic cylinder at a bias pressure that increases as the hydraulic cylinder moves in response to a rearward movement of the outer end of the implement frame. Thus the bias force exerted by the hydraulic cylinder increases as the rear outer portion of the implement frame moves away from the front inner portion of the implement frame, as may be desirable in some situations.

The diagonal brace apparatus of the invention is economical to provide compared to prior art braces, and is especially so where an active hydraulic source is already required for the implement on which the brace is used.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
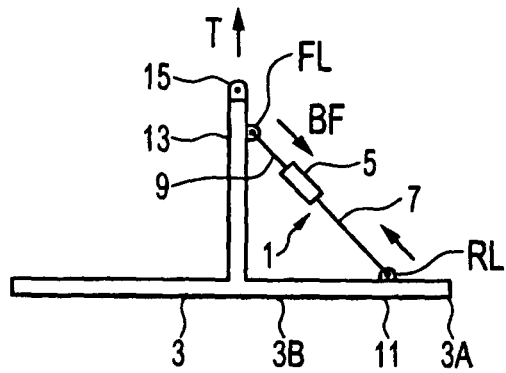
FIG. 1 is a schematic top view of an embodiment of the diagonal brace of the invention mounted on an implement frame.
Figure 2:
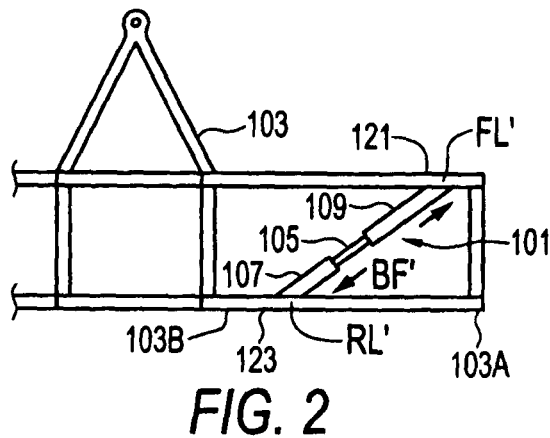
FIG. 2 is a schematic top view of an alternate embodiment of the diagonal brace of the invention mounted on an alternate implement frame.

FIGS. 1 and 2 schematically illustrate diagonal brace apparatuses 1, 101 for an implement frame comprising a bias element connectable to front and rear locations on the implement frame and operative to exert a bias force resisting rearward movement of an outer end of the implement frame with respect to an inner end of the implement frame when connected to the implement frame.

In the diagonal brace apparatus 1 of FIG. 1 the bias element 5 is adapted at a first end thereof for connection to a front location FL on a front portion of the implement frame 3 and adapted at a second end thereof for connection to a rear location RL on a rear portion of the implement frame 3 that is laterally offset from the front location FL toward an outer end 3A of the implement frame relative to the front location FL. The illustrated bias element 5 is attached at one end thereof to an inside end of a first brace member 7 and at an opposite end thereof to an inner end of a second brace member 9, and outside ends of the first and second brace members 7, 9 are attached to the implement frame.

The bias element 5 in the illustrated embodiment is operative to exert a bias force BF urging a rear outer portion 11 of the implement frame toward a front inner portion 13 of the implement frame 3. The illustrated brace apparatus 1 is in tension, and so the brace members 7, 9 can be provided by a cable, rod, rigid metal member, or the like The implements on which the diagonal brace 1 will be used typically will have ground engaging tools, wheels, or the like laterally spaced along the frame 3 which will resist movement. Thus when the implement is towed in a forward direction T by a tractor attached to the hitch 15, the outer end 3A of the implement frame 3 will tend to move rearward with respect to the inner end 3B, flexing the frame 3 rearward. Where these rearward forces are not excessive, such flexing is beneficial in providing a shock absorbing action when the frame 3 strikes an obstruction, such as a rock or the like. Where such forces are excessive, diagonal bracing is required to reduce metal fatigue caused by excessive flexing.

Conventional diagonal braces typically provide a cable or beam that makes the frame 3 diagonally rigid and prevents the frame from flexing, such that there is no shock absorbing action, and the implement must then be built stronger to withstand the higher shock forces resulting. In contrast the diagonal brace apparatus 1 of the invention allows the frame 3 to flex somewhat. The bias element 5 is typically sized or calibrated to initially preload the outer end 3A of the frame 3 forward with respect to the inner end 3B thereof such that initially forces encountered during normal operating conditions first flex the outer end of the frame 3A rearward against the bias force BF approximately to a neutral position, and then when an obstruction is encountered and forces on the outer end 3A of the frame 3 increase, the frame flexes rearward from the neutral position. The bias element 5 thus provides shock absorbing properties and maintains the motion of the outer end 3A of the frame 3 in a range forward and rearward from the neutral position and farther from the yield point at which the frame will bend, thus reducing metal fatigue.

FIG. 2 illustrates an alternate diagonal brace apparatus 101 where the rear location RL' is offset toward the inner end 103B of the implement frame 103 relative to the front location FL'. In this embodiment the bias element 105 is in compression and exerts a bias force BF urging a front outer portion 121 of the implement frame 103 away from a rear inner portion 123 of the implement frame 103. With such a compression configuration the brace members 107, 109 connecting the bias element 105 to the frame 103 must be rigid, and bias element must be attached to the brace members in a suitable manner such that the diagonal brace apparatus 101 extending from the front location FL' to the rear location RL' is rigid. For that reason, while a compression configuration is possible, the tension configuration of FIG. 1 allows for a simpler connection of the bias element to the frame with cables or the like.

Figure 3:
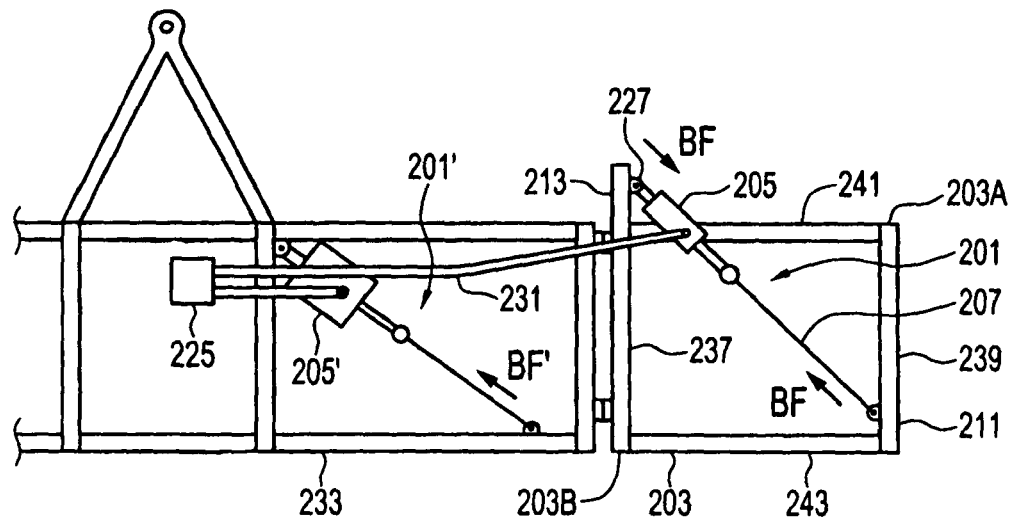
FIG. 3 is a schematic top view of a pair of further alternate embodiments of the diagonal brace of the invention mounted on a further alternate implement frame.

While it is contemplated that the bias element could be provided by a spring, air bag, or like known element for exerting a bias force, the bias element in the diagonal brace apparatus 201 of FIG. 3, shown installed on an implement wing frame 203, is conveniently provided by a hydraulic cylinder 205 operatively connected to an active hydraulic source 225. The active hydraulic source 225 is of the type well known and commonly used on agricultural implements to provide a biasing pressure for furrow openers, implement wings, and the like.

Figure 4:
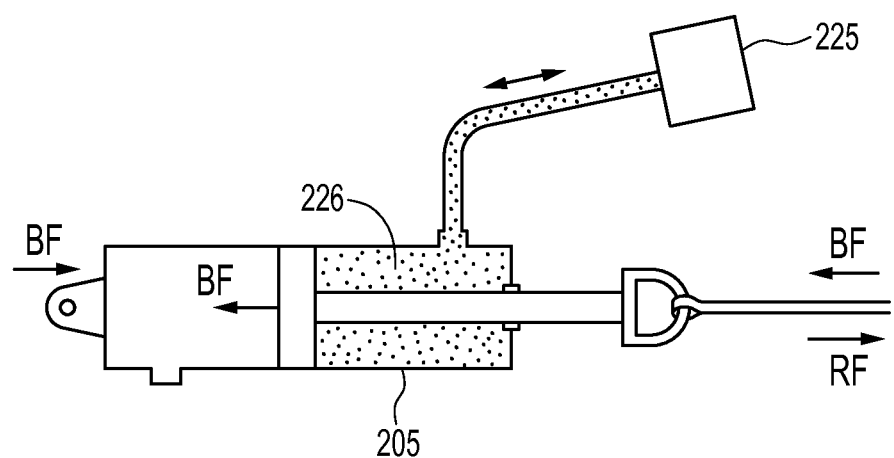
FIG. 4 is a schematic cut away view of a hydraulic cylinder for use with the embodiment of FIG. 3.

The active hydraulic source 225 is operative to supply hydraulic fluid to the hydraulic cylinder 205 at a substantially constant bias pressure such that the hydraulic cylinder 205 exerts a substantially constant bias force BF urging the rear outer portion 211 of the wing frame 203 toward the front inner portion 213 of the wing frame 203. FIG. 4 schematically illustrates the hydraulic cylinder 205 connected to the active hydraulic source 225. The active hydraulic source 225 allows hydraulic fluid 226 to flow out of the hydraulic cylinder 205 when a rearward force RF is exerted on the hydraulic cylinder 205 that is greater than the bias force. The hydraulic cylinder 205 and bias pressure are configured to provide a sufficient BF to reduce rearward flexing of the outer end 203A of the frame 203 to an acceptable level, and yet allow rearward flexing when excessive rearward force is applied to the outer end 203A of the frame 203, such as encountered when striking an obstruction.

Thus initially the bias force BF will flex the outer end 203A of the frame 203 forward and when the implement is engaged in the ground, and the rearward forces on the outer end 203A of the frame 203 exceed the bias force BF exerted by the bias pressure in the hydraulic cylinder 205, the outer end 203A of the frame 203 will move rearward extending the hydraulic cylinder 205 somewhat, forcing hydraulic fluid through the hydraulic conduit 231 into the active hydraulic source 225. The bias pressure and hydraulic cylinder size are typically calibrated such that during normal or average working conditions the outer end 203A of the frame 203 will move rearward to about a neutral position. When increased rearward forces are exerted on the outer end 203A of the frame 203, such as when an obstruction is encountered, the hydraulic cylinder 205 will extend further, and the outer end 203A will flex rearward past the neutral position.

On many agricultural implements such an active hydraulic source will be available and in use on the implement for biasing furrow openers, wings, or like applications. In such situations, the hydraulic cylinder 205 can be sized to have a diameter that will exert the desired bias force BF when the bias pressure therein is equal to the active hydraulic pressure in the existing system. Alternatively the active hydraulic source 25 can be supplied as is known in the art and the bias pressure and hydraulic cylinder diameter calibrated as desired to attain the required bias force BF.

Alternatively the hydraulic source 225 can include an accumulator that is pre-charged to a desired bias pressure. When the rear outer portion of the implement frame moves away from the front inner portion of the implement frame in response to excessive forces, the hydraulic cylinder extends and forces hydraulic fluid from the hydraulic cylinder into the accumulator, increasing the bias pressure in the accumulator and in the hydraulic cylinder, and thus increasing the bias force to resist the rearward movement.

The hydraulic cylinder 205 includes a lug 227 at one end thereof attached the front inner portion 213 of the wing frame 203, and the other end connected to the outer rear portion 211 of the wing frame 203 by a brace member 207, which is conveniently a cable or a rod suitable for exerting tension. The apparatus 201 could be installed with the hydraulic cylinder 205 attached to the outer rear portion 211 of the wing frame 203, however the installation on the inner end of the wing frame 203 requires a shorter hydraulic conduit 231 to connect to the active hydraulic source 225.

The illustrated wing frame 203 is an example of one of the widely varied implement frames that are known in the art, and comprises inner and outer fore and aft beams 237, 239 and front and rear lateral beams 241, 243. Each lateral beam 241, 243 has an inner portion attached to the inner fore and aft beam 237 and an outer portion attached to the outer fore and aft beam 239. The inner fore and aft beam 237 extends forward of the front lateral beam 241 and the hydraulic cylinder 205 is attached to the inner fore and aft beam 237 forward of the front lateral beam 241.

The wing frame 203 is shown pivotally attached at the inner end 203B thereof to the outer end of a middle frame 233. The middle frame 233 is similarly braced by a second diagonal brace apparatus 201' with a hydraulic cylinder 205' that has a larger diameter than the hydraulic cylinder 205 on the wing frame 203. Rearward forces exerted on the outer end 233A of the middle frame 233 will be larger than those exerted on the outer end 203A of the wing frame 203. The hydraulic cylinder 205' therefore has a larger diameter such that with the same bias pressure from the active hydraulic source 225, the bias force BF' exerted by the diagonal brace 201' will be greater than bias force BF exerted by the diagonal brace 201.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A rigid implement frame comprising:
   at least one rigid lateral beam having an inner beam end rigidly attached to an inner portion of the implement frame, the at least one lateral beam extending from the inner beam end outward to an outer beam end;
   a hydraulic cylinder having a first end connected to a front inner portion of the implement frame forward of the inner beam end, and a second end connected to an outer portion of the lateral beam;
   a hydraulic source operative to supply hydraulic fluid to the hydraulic cylinder at a bias pressure such that the hydraulic cylinder exerts a bias force urging the outer portion of the lateral beam toward the front inner portion of the implement frame, and the hydraulic source operative to allow hydraulic fluid to flow out of the hydraulic cylinder when a force is exerted on the hydraulic cylinder that is greater than the bias force.

2. The apparatus of claim 1 wherein the hydraulic source includes an accumulator operative to supply hydraulic fluid to the hydraulic cylinder at a bias pressure that increases as the hydraulic cylinder moves in response to a rearward flexing movement of the outer portion of the implement frame such that the bias force exerted by the hydraulic cylinder increases as the outer portion of the implement frame moves away from the front inner portion of the implement frame.

3. The apparatus of claim 1 wherein the hydraulic source comprises an active hydraulic source operative to supply hydraulic fluid to the hydraulic cylinder at a substantially constant bias pressure such that the hydraulic cylinder exerts a substantially constant bias force urging the outer portion of the lateral beam toward the front inner portion of the implement frame.

4. The apparatus of claim 1 wherein the hydraulic cylinder is attached at a frame end thereof to one of the front inner portion of the implement frame and the outer portion of the lateral beam, and is attached at a brace end thereof to a first end of a brace member, and the brace member is attached at a second end thereof to the other of the front inner portion of the implement frame and the outer portion of the lateral beam.

5. The apparatus of claim 4 wherein the brace member is provided by one of a cable, a rod, and a rigid metal member.

6. The apparatus of claim 1 wherein the hydraulic cylinder is attached at one end thereof to an inside end of a first brace member and the hydraulic cylinder is attached at an opposite end thereof to an inside end of a second brace member, and wherein outside ends of the first and second brace members are attached respectively to the front inner portion of the implement frame and the outer portion of the lateral beam.

7. The apparatus of claim 6 wherein at least one brace member is provided by one of a cable, a rod, and a rigid metal member.

* * * * *